United States Patent
Yeager et al.

(10) Patent No.: US 10,345,159 B1
(45) Date of Patent: Jul. 9, 2019

(54) VISUAL AND ELECTRONICALLY READABLE TEMPERATURE INDICATOR

(71) Applicant: KLT Technology, INC., Dayton, OH (US)

(72) Inventors: Steven L. Yeager, Miami Township, OH (US); Jason M. Romine, Dayton, OH (US); Carl M. Lentz, Waynesville, OH (US); Thomas Randall Lane, Lebanon, OH (US); Robin A. Snyder, Bellbrook, OH (US)

(73) Assignee: KLT Technology, INC., Dayton, OH (US)

( * ) Notice: Subject to any disclaimer, the term of this patent is extended or adjusted under 35 U.S.C. 154(b) by 0 days.

(21) Appl. No.: 15/926,009

(22) Filed: Mar. 20, 2018

(51) Int. Cl.
*G01K 1/02* (2006.01)
*G01K 11/06* (2006.01)
(Continued)

(52) U.S. Cl.
CPC ............... *G01K 11/06* (2013.01); *G01K 7/16* (2013.01); *G01K 11/12* (2013.01)

(58) Field of Classification Search
CPC .......... G01K 1/02; G01K 11/06; G01K 1/024; G01K 1/143; G01K 1/022; G01K 1/08;
(Continued)

(56) References Cited

U.S. PATENT DOCUMENTS 4,280,411 A    7/1981  McNeeley
5,709,472 A *  1/1998  Prusik ...................... G01K 3/04
                                                         116/219
(Continued)

FOREIGN PATENT DOCUMENTS

CN       2884169 Y  *  3/2007
JP    2003-065862       3/2003
(Continued)

OTHER PUBLICATIONS

PCT, International Search Report and Written Opinion, International Application No. PCT/US2017/014872 (dated Apr. 20, 2017).
(Continued)

*Primary Examiner* — Gail Kaplan Verbitsky
(74) *Attorney, Agent, or Firm* — FisherBroyles, LLP; Susan M. Oiler

(57) ABSTRACT

Visually and electronically readable temperature indicators have an electric circuit having a microchip and a bridge within the circuit and a porous substrate in direct contact with the bridge. The porous substrate has a first end protruding beyond a perimeter of the bridge with a temperature sensitive composition of a pre-selected melt temperature as a dry coating thereon. The bridge is formed of a conductive material and a binder. At a temperature at or above the pre-selected melt temperature, the temperature sensitive composition melts, migrates along the porous substrate to a position in contact with the bridge, thereby rendering the bridge electrically non-conductive or less conductive than an originally conductive state of the bridge, and provides a visible indication that the pre-selected melt temperature has been reached.

24 Claims, 4 Drawing Sheets

(51) Int. Cl.
*G01K 7/16* (2006.01)
*G01K 11/12* (2006.01)

(58) Field of Classification Search
CPC ............ G01K 1/14; G01K 7/01; G01K 13/00;
G01K 2217/00; G06K 19/0723; G06K
19/0717; H01Q 1/2225; H01Q 1/243;
B32B 2519/00
USPC .............. 374/160, 162, 178, 120, 100, 101;
340/870.17
See application file for complete search history.

(56) References Cited

U.S. PATENT DOCUMENTS

| | | | |
|---|---|---|---|
| 7,209,042 B2 | 4/2007 | Martin et al. | |
| 7,306,489 B2 | 12/2007 | Werthman et al. | |
| 7,380,982 B2 | 6/2008 | Lohokare | |
| 7,795,605 B2 | 9/2010 | Habib et al. | |
| 8,066,432 B2 | 11/2011 | Yang et al. | |
| 8,267,576 B2 | 9/2012 | Hearer et al. | |
| 8,395,521 B2 | 3/2013 | Kauffman et al. | |
| 8,968,662 B2 | 3/2015 | Haarer et al. | |
| 8,978,575 B2 * | 3/2015 | Liu | B41J 2/195 |
| | | | 116/217 |
| 9,618,398 B2 * | 4/2017 | Deng | B65D 79/02 |
| 2013/0224875 A1 | 8/2013 | Haarer et al. | |
| 2013/0235112 A1* | 9/2013 | Liu | B41J 2/195 |
| | | | 347/17 |
| 2016/0290871 A1* | 10/2016 | Kozono | B32B 7/12 |
| 2017/0043095 A1* | 2/2017 | Nagraj | G01K 11/06 |
| 2017/0205295 A1* | 7/2017 | Newport | A23L 3/00 |
| 2017/0211992 A1* | 7/2017 | Yeager | G01K 7/20 |
| 2018/0069291 A1* | 3/2018 | Davis | H01Q 1/2225 |
| 2018/0174017 A1* | 6/2018 | Yan | G06K 19/07779 |

FOREIGN PATENT DOCUMENTS

| | | |
|---|---|---|
| JP | 2011-216221 | 10/2011 |
| JP | 2014-169918 | 9/2014 |

OTHER PUBLICATIONS

What is a PCM?, as early as Mar. 14, 2014, http://microteklabs.com/what-is-a-pcm.html.

* cited by examiner

FIG. 6
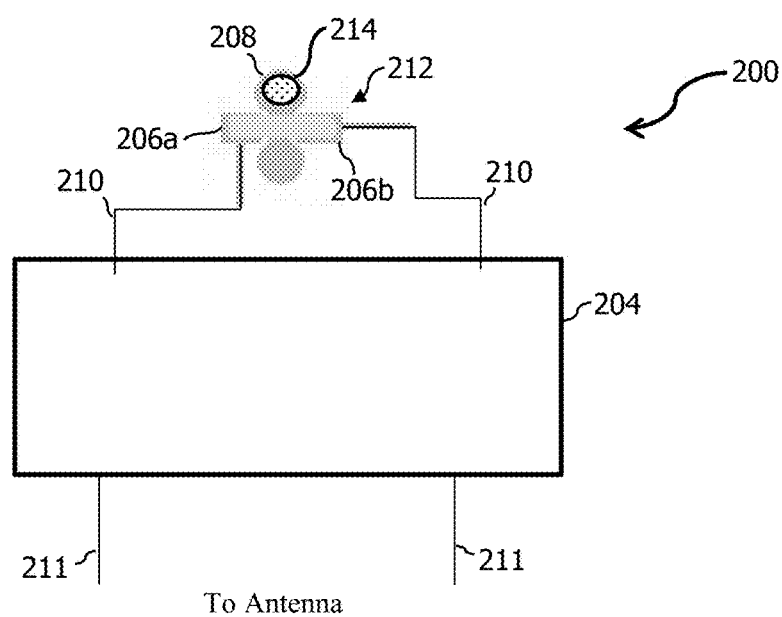
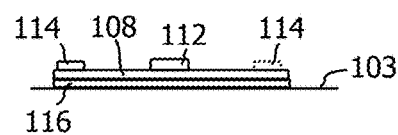
FIG. 7
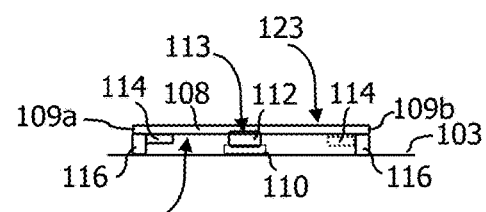
FIG. 8

US 10,345,159 B1

VISUAL AND ELECTRONICALLY READABLE TEMPERATURE INDICATOR

TECHNICAL FIELD

The present invention relates generally to a visual and electronically readable temperature indicator and, more particularly, to a temperature indicator having a bridge in a portion of the circuitry that changes from conductive to nonconductive upon occurrence of a temperature event.

BACKGROUND

It is imperative for certain products to be kept below a specific temperature, for example perishable foods and pharmaceuticals. It has long been a problem to track the temperatures of such products and many methods and devices have been tried, but there is still room for improvement.

Currently, there are irreversible indicators available that undergo a permanent color change when exposed to a temperature excursion. Also, there are electronic temperature monitors that can record the temperature to which a product has been exposed over a specified time interval, i.e., time-temperature indicators. These electronic temperature monitors are battery powered, which is a limitation because the battery could die or fail, and data may not be collected or may be lost.

There is a need for indicators that do not use a battery, provide self-verification, and have more than one mode of indicating a temperature event.

SUMMARY

In one aspect, visually and electronically readable temperature indicators are described that have an electric circuit having a microchip and a bridge within the circuit, a porous substrate in direct contact with the bridge and having a first end protruding beyond a perimeter of the bridge, and a temperature sensitive composition with a pre-selected melt temperature as a dry coating on the first end of the porous substrate. The bridge is defined by a conductive material and a first binder. In operation, at a temperature at or above the pre-selected melt temperature, the temperature sensitive composition melts, migrates along the porous substrate to a position in contact with the bridge, thereby rendering the bridge electrically non-conductive or less conductive than an originally conductive state of the bridge, and the temperature sensitive composition provides a visible indication that the pre-selected melt temperature has been reached.

In one embodiment, the electronic circuit is an RFID tag. In one embodiment, the microchip is non-readable when the bridge is electrically conductive and readable when the bridge is non-electrically conductive. In another embodiment, the microchip reads a first code when the bridge is electrically conductive, and a second code when the bridge is non-electrically conductive or less conductive than the original electrically conductive state, the second code being different from the first code. In one embodiment, the bridge forms an electrically conductive bypass around the chip.

In one embodiment, the conductive material comprises graphene.

In all aspects, the visual indication is a revelation of an indicia obscured by the temperature sensitive composition, a revelation of a special effect pigment, or a migration of a colorant. The electronic circuit may include a facing material over the electric circuit having a transparent window or an absorbent material positioned over at least the first end of the porous substrate.

In all aspects, the temperature sensitive composition comprises a phase change material, a second binder, and one or both of a colorant and special effect pigment. The conductive material comprises metal in powder form and comprises one or more of nickel and silver metal powder.

In numerous embodiments, the temperature sensitive composition comprises a phase change material and a second binder and has a pre-selected melt temperature within a range of 20° C. to 80° C. In one embodiment, the phase change material comprises a carboxylic acid, and the first binder is an acrylic binder.

In all aspects, the porous substrate can be adhered to the electric circuit. In one embodiment, the porous substrate is underneath the bridge, and in another embodiment, the porous substrate is on top of the bridge.

BRIEF DESCRIPTION OF THE DRAWINGS

FIG. 6 is a is a schematic view of an embodiment of an electronic circuit having a bridge of conductive material, a phase change material, and a colorant over code circuit contacts.

FIG. 7 is a cross-sectional view along line 7-7 in FIG. 4.

FIG. 8 is a cross-sectional view of a third embodiment of an RFID tag.

DETAILED DESCRIPTION

Figure 1:
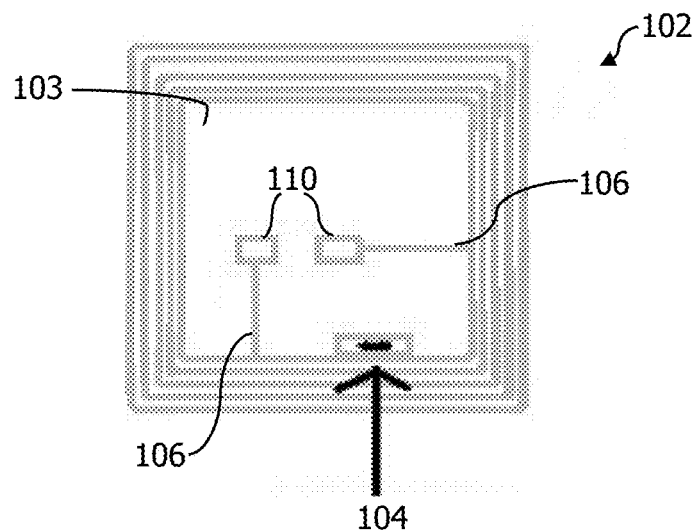
FIG. 1 is a top plan view of an RFID tag.

The following detailed description will illustrate the general principles of the invention, examples of which are additionally illustrated in the accompanying drawings. In the drawings, like reference numbers indicate identical or functionally similar elements.

As used herein, the term "about" allows a degree of variability in a value or range, for example, within 10% of a stated value or of a stated limit of a range for all embodiments, but within 5% of a stated value or of a stated limit of a range in more preferred embodiments.

Hybrid indicators, as used herein, means a temperature indication that uses electronics as well as a visual color or a color change to signal when a predetermined temperature limit has been reached. This mechanism creates a system that verifies itself. The color or color change allows for visual identification of which tag, and ergo which product, has reached a predetermined temperature, typically an undesired temperature. An electronic signal is also sent out, which can be read by an electronic reader. Thus, warning and documenting that the product has reached the predetermined temperature, which if it is an undesired temperature, documents that the product has been compromised.

Referring now to FIG. 1, in one aspect of a hybrid indicator, the electronics are present as an RFID circuit 102, but is not limited thereto, and may be any other electronic circuit having no battery and being electronically readable, such as a printed circuit board. A basic RFID system is comprised of an RFID tag and an RFID reader. The RFID circuit 102 has two basic components: a microchip 104 and an antenna 106, which may be divided into two leads terminating with bridge contacts 110 as shown in FIG. 1. The microchip 104 contains information about a product, for example, but not limited to, the product name, lot code or unique serial number, internet links to the manufacturer for instructions and data upload to the cloud, etc., and may include a serial number unique to the RFID circuit 102. Herein, the RFID circuit may be referred to as an RFID tag or RFID label when it is affixed to a product or its packaging. Typically, the antenna 106 collects energy from the reader and turns on the microchip. The RFID reader receives data from the microchip through the tag's antenna. The tag can be made to transmit the data by any number of RFID systems: low frequency, high frequency, UHF, NFC, or microwave.

Figure 2A:
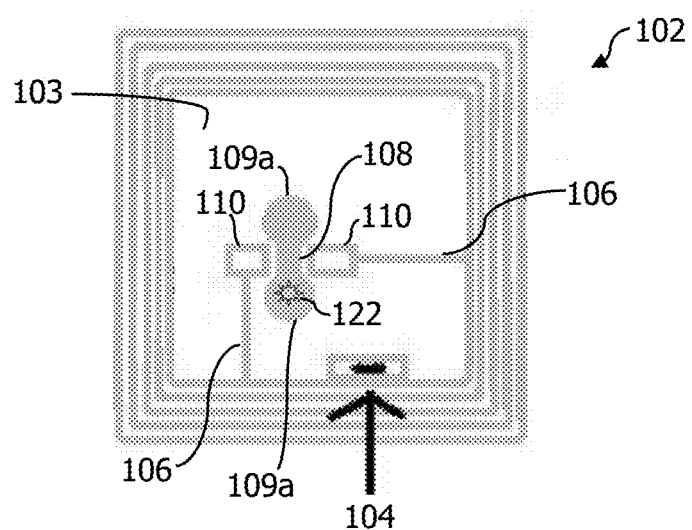
FIG. 2A is a top plan view of the RFID tag of FIG. 1 with one embodiment of a porous substrate between the bridge contacts of an antenna without contacting the bridge contacts.
Figure 2B:
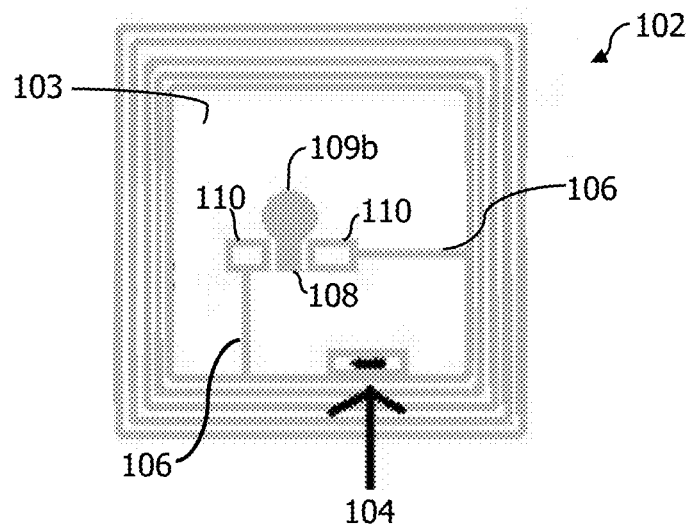
FIG. 2B is a top plan view of the RFID tag of FIG. 1 with a second embodiment of a porous substrate between the bridge contacts of an antenna without contacting the bridge contacts.
Figure 3:
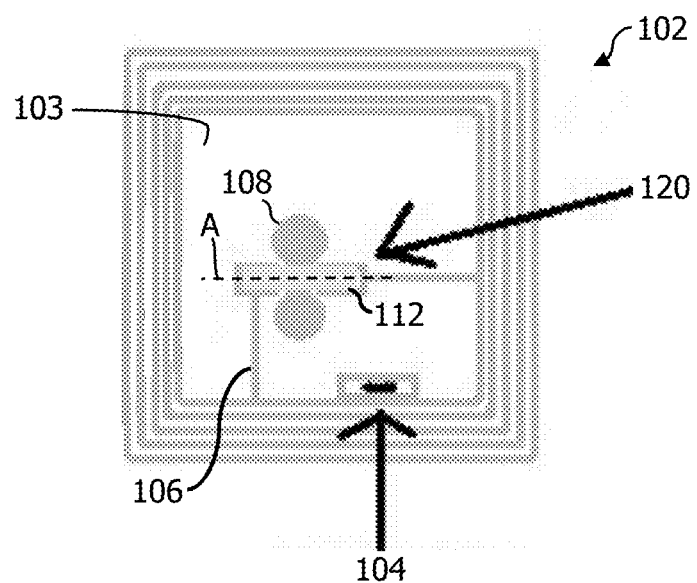
FIG. 3 is a top plan view of the RFID tag of FIG. 2 with a layer of conductive material as a bridge from bridge contact to bridge contact, which is transverse to and overtop of the porous strip, to form a bypass circuit around the microchip.
Figure 4:
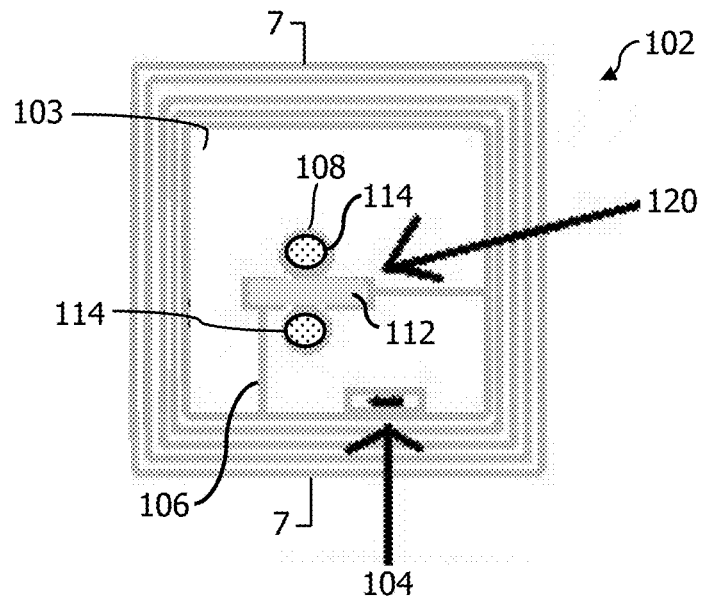
FIG. 4 is top plan view of the RFID tag of FIG. 3 with the addition of a temperature sensitive composition to opposite, exposed ends of the porous substrate. an enlarged, top plan view of the base layer of conductive material.

The electronic circuit 102 is then modified, progressively, as shown in FIGS. 2 through 4, to include a bridge 112 connecting the bridge contacts 110 of the two leads of antenna 106, which are a few millimeters apart, to create and electrically conductive bypass circuit 120 around the microchip 104. The bridge 112 has a central longitudinal axis A and includes a conductive material, such that the bypass circuit 120 is initially conductive, meaning that current is diverted around the microchip 104 so that the microchip cannot be read. Underneath the bridge 112 and in direct contact therewith is a strip of a porous substrate 108, which has no contact with the bridge contacts 110 of the two leads of the antenna 106 and has one end 109b (FIG. 2B) or opposing ends 109a (FIG. 2A) protruding beyond the perimeter of the bridge 112 (on opposite sides of the bridge). In the illustrated embodiments, the strip of porous substrate 108 is oriented generally transverse to the central longitudinal axis A of the bridge 112 and is shaped like a dumbbell, but is not limited thereto. The first and second ends 109a, 109b merely need to be of a shape and size to receive at least a droplet of temperature sensitive composition (TSC) 114 as shown in FIG. 4. The temperature sensitive composition has a preselected melt temperature. The porous substrate 108 may be fixed to the surface 103 by an adhesive. The adhesive layer 116 is best seen in FIG. 7, a cross-section view along line 7-7 of FIG. 4.

Figure 5:
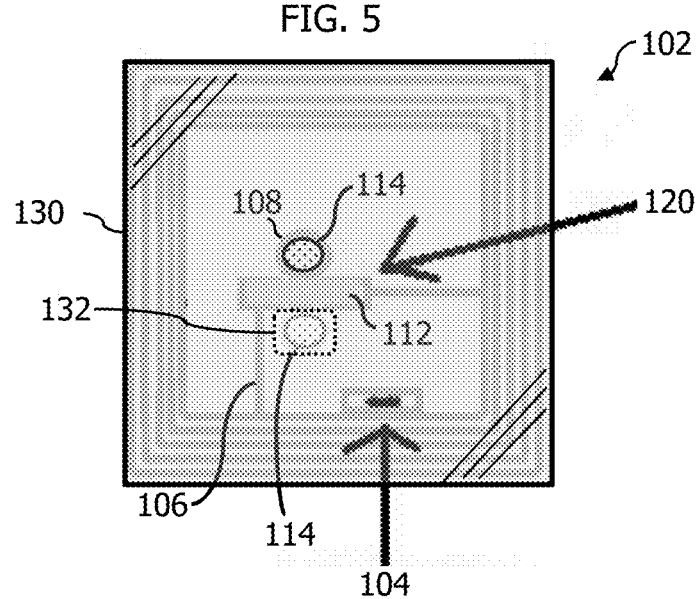
FIG. 5 is a top plan view of a completed RFID tag with a facing material over the bypass circuit.

The hybrid indicators disclosed herein may be constructed in the form of a tag or label integral with packaging or applicable to packaging. Here, the electronic circuit can have a back layer, such as a protective film or paper, that may or may not have an adhesive layer on the side opposite the electronic circuit to allow bonding of the hybrid indicator to a product or its packaging. With reference to FIG. 5, the opposite face of the electronic circuit (opposite the back layer, i.e., the front face 103) may be covered with a facing material 130 that enables the colorant to be visible to the user after the selected temperature was reached. In one embodiment, the facing material 130 includes a paper layer suitable for absorbing the colorant, at least over the ends 109a, 109b of the porous substrate 108. As such, the colorant migrates from a backside of the paper layer to a front side where the colorant is visible to the user. In another embodiment, the facing material 130 has a transparent window 132 positioned over one or more of the ends 109a, 109b of the porous substrate 108 through which the colorant or other indicia is visible once the preselected melt temperature is reached. If the entire facing material 130 is a paper layer, a protective laminate may be positioned as the outermost layer over the paper layer to protect the paper layer and its appearance.

In operation, at a temperature below the preselected melt temperature, the bridge 112 is conductive and the bypass circuit is conductive. At a temperature at or above the pre-selected melt temperature, the temperature sensitive composition 114 melts, migrates along the porous substrate 108 to a position underneath the bridge 112, thereby diluting the conductive material and rendering the bridge 112 electrically non-conductive. The binder in the conductive coating absorbs a phase change material from the temperature sensitive composition, thereby swelling and softening the conductive coating. The phase change material is nonconductive and physically separates and wraps the conductive powder, thereby reducing the conductivity. Further, the melting and migration of the temperature sensitive composition provides a visible indication that the pre-selected melt temperature has been reached. The visual indication can be a revelation of an indicia obscured by the temperature sensitive composition, a revelation of a special effect pigment, or a migration of a colorant, for example, migration to the facing material 130.

The porous substrate 108 is typically paper, but other materials can be used. One example is Tyvek® flashspun high-density polyethylene fibers. The porous substrate 108 may be diecut from adhesive label stock having a pressure sensitive adhesive on one major surface thereof. Referring to FIG. 2A, one or both ends 109a of the porous substrate 108 may include indicia 122 that once revealed indicates that a temperature changes at or above the pre-selected temperature has occurred. Indicia 122 can be a word, letters, image, color, or combination thereof obscured from the view of the user by the dry coating of the temperature sensitive composition 114. In one embodiment the TSC 114 is an opaque white dry coating.

The composition of the bridge 112 is comprised of a binder, a solvent (evaporated), rheological modifiers, and a conductive powder. This composition comprises about 20 percent to about 65 percent by weight of the conductive powder, about 2 percent to about 35 percent by weight of binder, about 15 percent to about 78 percent by weight of solvent, and about 0.2 percent to about 1 percent by weight of rheological modifier. More typically, the composition comprises about 40 percent to about 65 percent by weight of the conductive powder, about 20 percent to about 35 percent by weight of the binder, about 0.3 percent to about 1 percent by weight of rheological modifier, and about 15 percent to about 25 percent by weight of solvent. The composition for the bridge 112 may be applied by any known method, such as, printing, daubing, coating, or any other method of applying a wet composition that subsequently dry. Printing methods include, but are not limited to, flexography, screen printing, gravure, stenciling, and inkjet printing.

Regardless of the conductive powder used, the coating must target a selected resistance range for readability versus non-readability of the microchip or for toggeling between different codes, one readable at a first temperature and the second readable at a temperature above a threshold temperature (the preselected melt temperature of the temperature sensitive coating). In one embodiment, the bridge 112 (i.e., the conductive composition in a dry state) has a conductivity that is less than 10 ohms. Then, after the temperature sensitive composition 114 melts and the phase change material migrates under the bridge 112, the conductivity of the bridge changes and is greater than 20 MΩ. This drastic change in conductivity makes the invention effective for all types of electronic circuits. In other embodiments, there may be some readability at 1000Ω, and the circuit is considered "closed" at 100Ω or less (i.e., conductive), more preferably, 20Ω or less. An RFID tag that is toggelable between different codes may have resistance requirements that vary for different configurations. In one example, an RFID tag reads one code when the bridge has a resistance that is greater than 20 MΩ and reads another code when the bridge has a resistance that is less than 20 MΩ.

The binder can be comprised of either water soluble polymers, water-based polymer emulsions, and/or solvent soluble polymers. Solvent soluble polymers include, but are not limited to, acrylics, block copolymers, such as styrene isoprene styrene, ethylcellulose, and combinations thereof. Water soluble polymers include, but are not limited to, polyvinylpyrrolidone, polyvinyl alcohol, hydroxy ethylcellulose, and combinations thereof. Emulsion polymers include, but are not limited to, acrylic, styrene-butadiene, and ethylene vinyl acetate. The binder is selected to provide adhesion of the composition to the surface of the electronic circuit, to be flexible while maintaining conductivity, and to be semi-soluble in a component of a temperature sensitive composition 114 when the temperature sensitive composition melts.

The solvent is one that is effective at dissolving the binder and at evaporating at a reasonable rate. Examples of suitable solvents include water, isopropyl alcohol, ethyl alcohol, mineral spirits, toluene, xylene, esters, and glycol ethers, and combinations thereof.

The rheological modifier provides flow characteristics for the application and suspends the conductive powder in solution. Example rheological modifiers include, but are not limited to, bentonite clays, precipitated silica, cellulose ethers (examples include cellulose ethers, such as CELLOSIZE™ hydroxyethylcellulose), alkali swellable thickners (examples include copolymers of methacrylic acid and ethyl acrylate ester, such as ACRYSOL™ ASE rheology modifiers, available from The Dow Chemical Company), and associative thickeners (examples include hydrophobically-modified ethylene oxide-based urethane and hydrophobically-modified alkali soluble emulsion also sold under the ACRYSOL™ brand by The Dow Chemical Company).

The conductive powder is one that is dispersed in the binder and solvent solution, and when the coating is applied and dried, the conductive powder is held by the binder onto the electronic circuit, thereby forming a conductive pathway. Example conductive powders include copper, tin, zinc, aluminum, silver, and nickel as metals, and carbon, such as graphene. "Powder" as used herein include flakes as well as powder and spherical powder forms. In one embodiment, the composition is comprised of silver powder in an aqueous acrylic emulsion with a clay-based rheological modifier. The silver powder is 40% by weight to 62% by weight, the acrylic emulsion is 20% by weight to 35% by weight, water is 15% by weight to 25% by weight, and the clay-based rheolicical modifier is 0.3% by eight to 1% by weight of the composition (wet). In one embodiment, the composition is comprised of nickel powder, isopropyl alcohol, and ethylcellulose. The ratio of conductive powder to binder and coating thickness controls the conductivity of the coating. A ratio 1:1 to 20:1 on a dry basis, with a preferred range of 4:1 to 10:1 provides effective conductivity, flexibility, and adherence of the conductive composition to the electronic circuit as bridge 112. Once dry, the bridge has a thickness of 0.5 mils to 4 mils, with a preferred thickness of 2 mils to 3 mils.

Four different types of conductive nickel powders, such as those available from Novamet Specialty Products of Lebanon, Tenn., are effective. The first type is conductive nickel spheres (CNS) having particle sizes ranging from 1-30 µm. CNS also possesses magnetic properties, allowing the particles to be aligned magnetically to form circuit paths. CNS contains no agglomerates, which means that a greater packing density can be achieved. A second type is silver coated nickel spheres having a particle size of 35-45 µm. These possess magnetic properties, allowing the particles to be aligned magnetically. The third and fourth types are conductive nickel powders of either 525-A or 525-B, available from Novamet. 525-A is a low density form of 525-B, and both are high purity filamentary powders made from thermal decomposition of nickel carbonyl that has been screened to remove large or agglomerated particles, further ensuring that the particle size is uniform and consistent throughout. Both forms have branch-like particle structures, increasing the electrical conductivity.

Various other example conductive powders available from various suppliers are listed in Table 1 below. Table 1 is understood to be a non-exhaustive, merely representative list of examples.

| Compound | Supplier | Particle Size |
| --- | --- | --- |
| Copper | Sigma Aldrich | <425 µm |
| Tin | Sigma Aldrich | <150 µm |
| Zinc | Sigma Aldrich | <10 µm |
| Aluminum | Sigma Aldrich | <5 µm |
| Silver | Sigma Aldrich | <100 nm |
| Carbon | Sigma Aldrich | 96.3 µm |
| Graphene | XG Sciences | 2-15 µm |

Referring to FIG. 4, the temperature sensitive composition (TSC) applied to the end(s) 109a, 109b of the porous strip 108 may be applied thereto by any known method, such as, printing, daubing, coating, or any other method of applying a wet composition that dries in place. Printing may be any of the methods disclosed above. The TSC is comprised of a binder, a solvent (evaporated), and a phase change material (PCM). The composition may comprise binder as 0.5% to 5% by weight, the PCM as 10% to 40% by weight, and the solvent as 55% to 92% by weight of the composition (wet). When the dry TSC is exposed to a temperature over its selected melt temperature, the phase change material melts and is absorbable by the porous substrate. Optionally, the TSC may include a colorant as 0.1 to 2% by weight of the composition (wet). Other material know to improve print quality, flow, microbial resistance, and any other beneficial property can be included in the TSC.

The binder selected is to assist with emulsification of the PCM in solution, to hold the PCM particles in suspension in solution, to produce a flexible layer once applied to the electronic circuit, and to bind the PCM particles when the solvent evaporates. Also, the binder is considered for its effectiveness in low concentration. If the concentration of the binder is too high, it will encapsulate the PCM, which is undesirable because the PCM will not flow/migrate along the porous substrate into contact with the conductive coating, thereby diluting it and rendering it nonconductive. Examples of suitable binders include, but are not limted to, cellulose deriviatives, such as hydroxy ethylcellulose and hydroxy propyl cellulose, polyvinyl alcohol, alkyl acrylate crosspolymer, acrylics, and combinations thereof.

Suitable solvents include, but are not limited to, ethyl alcohol, isopropyl alcohol, mineral spirits, water, and combinations thereof. Other solvents that evaporate or dry comparably to these example solvents are also suitable.

The PCM controls the temperature response of the hybrid indicator, and is selected to penetrate or dissolve the binder in the bridge. Examples of PCMs are alkanes, alcohols, esters, carboxylic acids, and combinations (i.e., mixtures) thereof. The PCMs are not encapsulated or microencapsulated. Alcohols work well because they can partially dissolve ethylcellulose, if it is selected as the binder in the conductive composition, and the alcohols can be mixed together to get any number of melt points. Either esters or alkanes work well with block copolymer rubbers or styrene butadiene rubber, if selected as the binder in the conductive composition, because they swell these polymers, which will separate the conductive particles, reducing conductivity. Carboxylic acids work well with acrylic binders, if selected as the binder in the conductive material, and carboxylic acids can be mixed together to get any number of melt points. Different molecular weight members within each family can be mixed to get any number of melt points. If the PCM is emulsified in the solvent, the PCM's mean particle size is about 5 µm to 50 µm, with a preferred particle size of about 15 µm to about 25 µm.

The alkanes include one or more straight-chain alkanes or paraffinic hydrocarbons having 12 to 44 carbons, represented by the formula $C_nH_{n+2}$. It can be appreciated from this range of carbons that it is understood that each alkane increasing in length by 1 carbon is described individually by this range. Some example paraffin hydrocarbons within this range are listed in the table below, along with their respective melting point:

| Compound Name | # Carbon Atoms | Melting Point (° C.) |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Suitable alcohol phase change materials include one or more alcohols where the major component is, for example, n-decanol, n-dodecanol, n-tetradecanol, n-hexadecanol, and n-octadecanol. Other suitable alcohols include fatty acid alcohols such as capryl alcohol, lauryl alcohol, myristyl alcohol, cetyl alcohol, stearyl alcohol, arachidyl alcohol, behenyl alcohol, lignoceryl alcohol, ceryl alcohol, montanyl alcohol, myricyl alcohol, geddyl alcohol, and mixtures thereof.

Suitable ester phase change materials include one or more $C_1$-$C_{10}$ alkyl esters of $C_{10}$-$C_{24}$ fatty acids, particularly methyl esters where the major component is methyl behenate, methyl arachidate, methyl stearate, methyl palmitate, methyl myristate, methyl laurate, methyl formate, methyl caprylate, methyl caprate, and methyl lignocerate.

Carboxylic acids useful as PCMs, include, but are not limited to, caproic acid, caprylic acid, capric acid, lauric acid, myristic acid, oleic acid, palmitic acid, stearic acid, and combinations thereof.

The colorant is added to the PCM to allow for visual indication of a temperature excursion. Suitable colorants are soluble in the PCM. The most suitable colorants are solvent soluble dyes, for example, Red 24, Red 164, Red 27, Red 430, Green 3, Blue 35, Black 5, and Yellow 124. When the TSC melts, a portion of the liquid, which now has the dye dispersed therein, can be absorbed by a layer of paper or other secondary porous substrate positioned on top of at least one of the exposed ends of the porous substrate and will bleed through to a front face of the layer of paper. The colorant is now visible to an end user. For example, a target can be printed on the layer of paper or on a transparent window aligned with the layer of paper as black concentric circles and a red dye is incorporated into the TSC. The space between the black concentric circles will appear white until the TSC melts. After the TSC melts, the space between the black concentric circles will turn red.

The above visual changes occur within seconds after the TSC melts. The change in the readability of the electronic circuit is more desirable if it occurs within one to ten minutes after the TSC melts, but is not limited thereto. The amount of time to change the readability of the electronic circuit is controllable by varying the thickness and width of the conductive coating and the migration time for the TSC in the porous substrate. The migration time for the TSC can be varied by changing the length of the porous substrate, the amount of TSC applied, and the properties of the TSC. The amount of time can be tailored to be any selected number of minutes within the range from minutes to hours.

The colorant 132 may also be a special effect pigment. Special effect pigments are high aspect ratio pigments that, depending upon the viewing angle relative thereto, appear transparent or appear as a specific color or a range of colors. Typically, a large viewing angle makes the special effect pigments appear transparent. Special effect pigments are available commercially, for example, from BASF under the brand names LUMINA® and MIEARLIN® and Kobo Products, Inc. under the brand name KTZ®. Special effect pigments are available in a variety of color effects. The special effect pigment is incorporated in such layer as about 2% to about 8% wt/wt of the composition thereof. When the TSC is dry, the phase change material therein blocks the color reflectance of the special effect pigments. However, once the phase change material melts and is absorbed into the porous substrate, the special effect pigments are revealed, and the reflectance color thereof is now visible. When using a special effect pigment, a black porous substrate is typically used.

As applied, the thickness of the TSC once dry is at least 4 mils, with a preferred thickness of 4.5 mils to 8 mils.

Referring now to FIG. 6, another embodiment of a hybrid indictor 200 is illustrated. Here, rather than having a bridge across the antenna, the bridge 212 is across a different part of the circuit, in particular across code control contacts 206a, 206b. The microchip 204 is always "on," and reads a first code when the bridge 212 is conductive and reads a second code when the bridge is nonconductive, which is correlated to the presence of a TSC 214 on the porous substrate 108 (as described above in detail) and exposure to or above a threshold temperature thereof. Electrical leads 210 electrically connect the microchip 204 to the code control contacts 206a, 206b and electrical leads 211 electrically connect the microchip 204 to the antenna.

In all the compositions discussed above, the coating compositions may include other common additives to give desired characteristics, such as, but not limited to, emulsifiers, thickeners, preservatives, plasticizers, and defoamers.

Referring now to FIG. 8, rather than mounting the porous substrate underneath the bridge, the porous substrate 108 may be mounted in direct contact with the top surface 113 of the bridge 112. The porous substrate 108 is oriented generally transverse to the longitudinal axis of the bridge 112 and has opposing surfaces, one of which is in direct contact with the top surface of the bridge, which will be referred to as the bottom surface 122 of the porous substrate 108. The bottom surface 122, at the first and second ends 109a, 109b, has a layer of adhesive 116 that adheres the porous substrate 108 to the surface 103 of the electronic circuit. Juxtaposed to each adhesive layer 116 at a position inward along the porous substrate 108 away from the proximate end 109a, 109b, but not extending to or in contact with the bridge 112, is a deposit of the temperature sensitive composition 114. Here, in order for there to be a visual indication, as well as the electrical change in conductivity as described above for all embodiments, the TSC 114 includes a colorant that is soluble in the PCM as the visual indicator. Once the PCM melts, the colorant is solubilized and is absorbed into the porous substrate 108 and becomes visible once the colorant reaches the top surface 123 of the porous substrate 108.

Example 1

Part A: Preparation of a Conductive Composition 0.72 g of modified bentonite clay is dispersed in 24 g of water, and once hydrated, a water-based acrylic polymer emulsion having a Tg of −30 C was added and mixed thoroughly. 4-7 micron silver powder was added slowly to the solution with mixing. The composition is a viscous fluid of about 4000 centipoise to 8000 centipoise, and when printed at a 2 mil dry thickness has a resistance of less than 10 ohms over an area of 2 mm×10 mm.

Part B: Preparation of a Temperature Sensitive Coating

Myristic acid (melt point 53-54° C.) is melted in an oven. A solution of 1.5% Selvol™ polyvinyl alcohol (PVA) 540 is also heated in an oven. Using a homogenizer, the myristic acid is emulsified into the PVA, and subsequently cooled to room temperature without stirring.

Part C: Assembly

A porous substrate, such as 3M 3300-F label material, was cut into a "barbell" shape and was adhered to the RFID tag between the bridge contacts in the orientation shown in FIG. 2A. The conductive composition was screen printed across the porous substrate to form a bridge between the bridge contacts as shown in FIG. 3. The conductive composition was dried and when dried has a 2-3 mil thickness. Then, the temperature sensitive coating was applied to the exposed ends of the porous substrate by "dotting" thereon for a dry thickness of over 4 mils.

To test the hybrid indictor of Example 1, before exposure to a heat source, the hybrid indicator was placed within range of an RFID reader to ensure that the bypass circuit was indeed closed and that the microchip was not readable. Then, the RFID tag was sealed in a waterproof pouch and set in a controlled temperature water bath set at 35° C. and monitored with an electronic digital thermometer. The temperature was raised in 1.0° C. intervals and held 5 minutes at each interval. At each interval, the indicator was lifted to near the top of the water but not out of the water and brought into range of a reader. When the reader was able to read the microchip, the temperature was recorded to be 53° C. Over several trials of additional RFID tags, the temperatures varied slightly, but there was no more than a 1° C. difference.

The hybrid indicators disclosed herein provide multiple advantages, including a visual indicator to tell the user to scan or read a particular hybrid indicator and as a self-verification of a temperature change. The hybrid indicators are flexible so that the bridge maintains its conductivity in the initial phase and the bridge can be engineered to activate at a selected temperature. Using differing phase change material and/or combinations of the phase change material, the selected temperature is a temperature within the range of 20° C. to 80° C., and possibly higher. Furthermore, the hybrid sensors are a lower cost alternative with no battery, which also makes them lightweight.

Although the invention is shown and described with respect to certain embodiments, it is obvious that modifications will occur to those skilled in the art upon reading and understanding the specification, and the present invention includes all such modifications.

What is claimed is:

1. A visually and electronically readable temperature indicator comprising:
    an electric circuit having a microchip and a bridge within the circuit, wherein the bridge comprises a conductive material and a first binder and has a central longitudinal axis;
    a porous substrate oriented transverse to the central longitudinal axis of the bridge with a first end protruding beyond a perimeter of the bridge and a portion extending from the first end, the portion being in direct contact with the bridge; and
    a temperature sensitive composition having a pre-selected melt temperature as a dry coating is present only on the first end of the porous substrate and does not contact the bridge;
    wherein, at a temperature at or above the pre-selected melt temperature, the temperature sensitive composition melts, migrates along the porous substrate to a position in contact with the bridge, thereby rendering the bridge electrically non-conductive or less conductive than an originally conductive state of the bridge, which renders the microchip readable or nonreadable to indicate that the indicator has been exposed to the preselected melt temperature, and provides a visible indication that the pre-selected melt temperature has been reached;
    wherein a cross-section through the porous substrate transverse to the central longitudinal axis of the bridge has in order the following layers at the bridge: an adhesive layer, the porous substrate, the bridge; or the bridge, the porous substrate.

2. The temperature indicator of claim 1, wherein the electronic circuit is an RFID tag.

3. The temperature indicator of claim 1, wherein the microchip is non-readable when the bridge is electrically conductive and readable when the bridge is non-electrically conductive.

4. The temperature indicator of claim 1, wherein the microchip reads a first code when the bridge is electrically conductive, and a second code when the bridge is non-electrically conductive or less conductive than the original electrically conductive state, the second code being different from the first code.

5. The temperature indicator of claim 1, wherein the conductive material comprises graphene.

6. The temperature indicator of claim 1, wherein the visual indication is a revelation of an indicia obscured by the temperature sensitive composition, a revelation of a special effect pigment, or a migration of a colorant; wherein the special effect pigment comprises high aspect ratio pigments, that depending upon the viewing angle, relative thereto, appear transparent or appear as a specific color or a range of colors.

7. The temperature indicator of claim 6, a facing material over the electric circuit having a transparent window or an absorbent material over at least the first end of the porous substrate.

8. The temperature indicator of claim 1, wherein the temperature sensitive composition comprises a phase change material, a second binder, and one or both of a colorant and special effect pigment.

9. The temperature indicator of claim 1, wherein the conductive material comprises metal in powder form.

10. The temperature indicator of claim 9, wherein the metal in powder form comprises nickel, silver, or a mixture thereof.

11. The temperature indicator of claim 1, wherein the temperature sensitive composition comprises a phase change material and a second binder and has a pre-selected melt temperature within a range of 20° C. to 80° C.

12. The temperature indicator of claim 11, wherein the phase change material comprises a carboxylic acid.

13. The temperature indicator of claim 12, wherein the first binder is an acrylic binder.

14. The temperature indicator of claim 1, wherein the porous substrate is adhered to the electric circuit.

15. The temperature indicator of claim 1, wherein the strip of porous substrate has an opposite end protruding beyond the perimeter of the bridge, wherein the temperature sensitive composition is a dry coating present only on the first end and the opposing end of the porous substrate.

16. The temperature indicator of claim 15, wherein the strip of porous substrate is dumbbell-shaped.

17. The temperature indicator of claim 1, wherein the bridge forms an electrically conductive bypass around the microchip.

18. A visually and electronically readable temperature indicator comprising:
   an electric circuit having a microchip and a bridge within the circuit, wherein the bridge comprises a conductive material and a first binder;
   a porous substrate in direct contact with the bridge and having a first end protruding beyond a perimeter of the bridge; and
   a temperature sensitive composition having a pre-selected melt temperature as a dry coating on the first end of the porous substrate;
   wherein, at a temperature at or above the pre-selected melt temperature, the temperature sensitive composition melts, migrates along the porous substrate to a position in contact with the bridge, thereby rendering the bridge electrically non-conductive or less conductive than an originally conductive state of the bridge, which renders the microchip readable or nonreadable to indicate that the indicator has been exposed to the preselected melt temperature, and provides a visible indication that the pre-selected melt temperature has been reached;
   wherein the porous substrate is underneath the bridge.

19. A visually and electronically readable temperature indicator comprising:
   an electric circuit having a microchip and a bridge within the circuit, wherein the bridge comprises a conductive material and a first binder and has a central longitudinal axis;
   a strip of porous substrate oriented transverse to the central longitudinal axis of the bridge, wherein the strip of porous substrate has a section thereof in direct contact with the bridge and has a first end spaced a distance away from a perimeter of the bridge; and
   a deposit of a temperature sensitive composition on the first end of the strip of porous substrate; and
   a facing material over the electric circuit having a transparent window or an absorbent material over the first end of the porous substrate;
   wherein, at or above a pre-selected melt temperature of the temperature sensitive composition, the temperature sensitive composition melts, migrates along the strip of porous substrate from the first end to the section in direct contact with the bridge, thereby rendering the bridge electrically non-conductive or less conductive than an originally conductive state of the bridge, which renders the microchip readable or nonreadable to indicate that the indicator has been exposed to the preselected melt temperature, and provides a visible indication that the pre-selected melt temperature has been reached.

20. The temperature indicator of claim 19, wherein the microchip is non-readable when the bridge is electrically conductive and readable when the bridge is non-electrically conductive, or reads a first code when the bridge is electrically conductive, and a second code when the bridge is non-electrically conductive or less conductive than the original electrically conductive state, the second code being different from the first code.

21. The temperature indicator of claim 19, wherein the visual indication is a revelation of an indicia obscured by the temperature sensitive composition, a revelation of a special effect pigment, or a migration of a colorant; wherein the special effect pigment comprises high aspect ratio pigments, that depending upon the viewing angle, relative thereto, appear transparent or appear as a specific color or a range of colors.

22. The temperature indicator of claim 19, wherein the pre-selected melt temperature is within a range of 20° C. to 80° C.

23. A visually and electronically readable temperature indicator comprising:
   an electric circuit having a microchip and a bridge within the circuit, wherein the bridge comprises a conductive material and a first binder;
   a porous substrate in direct contact with the bridge and having a first end protruding beyond a perimeter of the bridge; and
   a temperature sensitive composition having a pre-selected melt temperature as a dry coating on the first end of the porous substrate;
   wherein, at a temperature at or above the pre-selected melt temperature, the temperature sensitive composition melts, migrates along the porous substrate to a position in contact with the bridge, thereby rendering the bridge electrically non-conductive or less conductive than an originally conductive state of the bridge, which renders the microchip readable or nonreadable to indicate that the indicator has been exposed to the preselected melt temperature, and provides a visible indication that the pre-selected melt temperature has been reached;

wherein the visual indication is a revelation of an indicia obscured by the temperature sensitive composition, a revelation of a special effect pigment, or a migration of a colorant; wherein the special effect pigment comprises high aspect ratio pigments, that depending upon the viewing angle, relative thereto, appear transparent or appear as a specific color or a range of colors.

24. The temperature indicator of claim 23, a facing material over the electric circuit having a transparent window or an absorbent material over at least the first end of the porous substrate.

* * * * *